M. BRENNER.
PROCESS OF PRESERVING AND PUTTING UP MEAT.
No. 188,774.             Patented March 27, 1877.
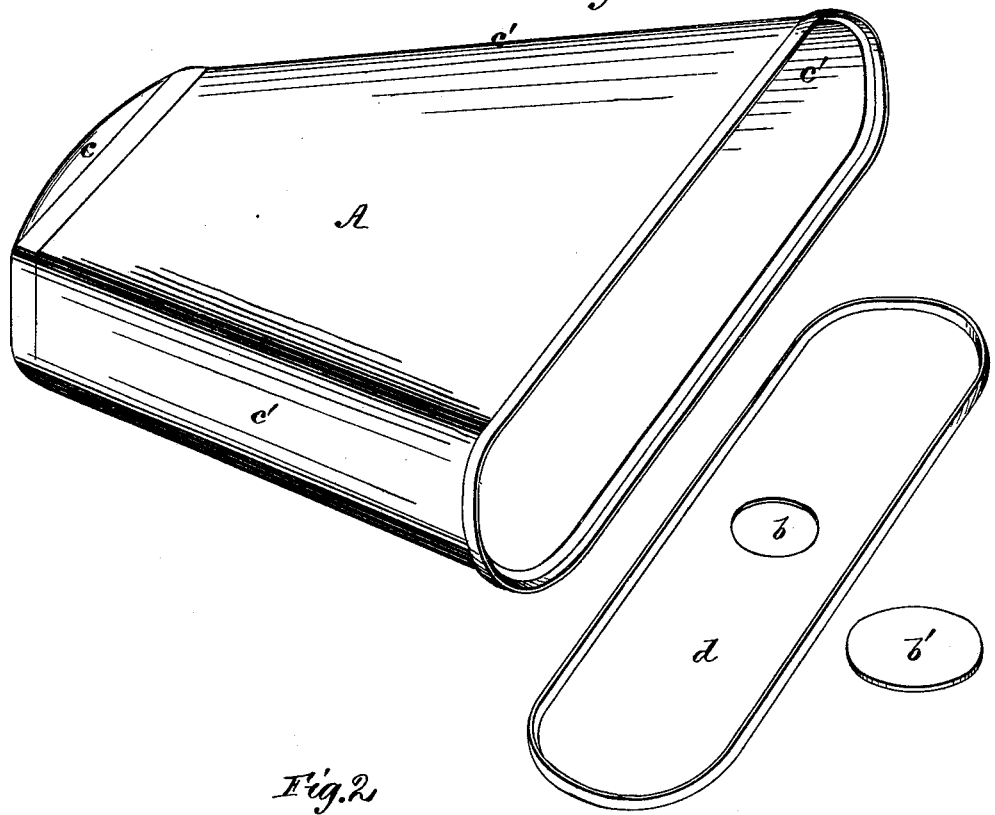
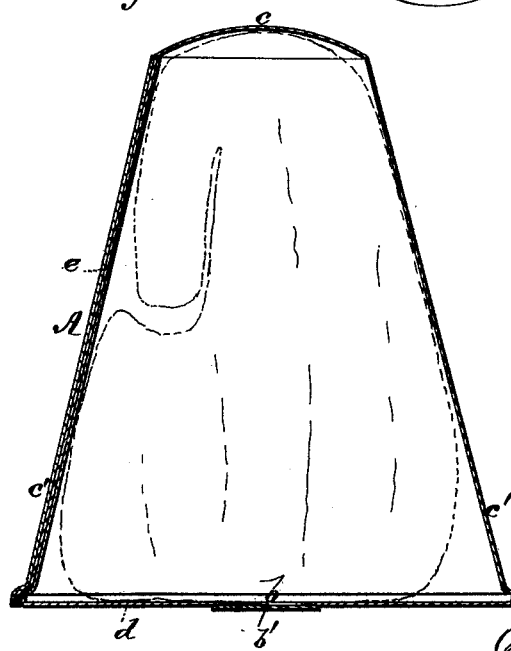
Witnesses.
James Martin Jr.
W. E. Chaffee
Inventor.
Moses Brenner
by
Mann, Fenwick & Lawrence

UNITED STATES PATENT OFFICE.

MOSES BRENNER, OF BALTIMORE, MARYLAND.

IMPROVEMENT IN PROCESSES OF PRESERVING AND PUTTING UP MEAT.

Specification forming part of Letters Patent No. 188,774, dated March 27, 1877; application filed December 11, 1876.

*To all whom it may concern:*

Be it known that I, MOSES BRENNER, of the city of Baltimore, county of Baltimore, and State of Maryland, have invented a new and useful process or mode of packing and preserving cooked and uncooked meats, which process is fully set forth in the following specification, reference being had to the accompanying drawings, illustrating the "can" which I use in carrying out my invention.

My invention relates to that class of processes employed for the preservation of meats which have been cooked, and thereafter put into cans and hermetically sealed therein for future use.

The nature of my invention consists in a process or mode of packing and preserving cooked meats in the general form or shape possessed by the meat before being cooked, or when raw, and which process or mode also preserves the natural juices and nutritious qualities of the meat for a great length of time.

My process or mode of proceeding is as follows: I first make a brine of salt, sugar, and saltpeter, and to such brine I then add pepper, cloves, allspice, and laurel-leaves. The relative proportion of each may be as follows—though I do not confine myself to such proportions—viz: to three gallons of water add two pounds of salt, one pound of sugar, one fourth of an ounce of saltpeter, one fourth of an ounce each of unground pepper, cloves, and allspice, and two ounces of laurel-leaves.

The antiseptic and preserving qualities of the three first-named ingredients, as well as the preserving and aromatic qualities of the pepper, cloves, and allspice, are well known. To these ingredients I add the laurel-leaves of commerce, chiefly grown in Southern Europe. These leaves are of an aromatic character, and impart to the brine an oily substance pleasant to the palate, and add, in connection with the spices, a fragrance to the meat cured therein.

Having prepared the brine, I then place therein, for example, a roasting-piece of fresh beef, and allow it to remain in the brine for twelve days, or thereabout. This meat at the expiration of this time is then cooked or steamed in a caldron not less than four hours at a proper temperature to make it palatable. The bones and useless pieces are then separated from the meat without destroying its general shape, after which, while still warm, and with its juices in it, it is packed in the tin can A shown in the drawings. This being done, all air and superfluous moisture are then extracted with proper machinery from the can through an aperture, $b$, in its bottom $d$, after which the can is hermetically sealed by soldering a piece of tin, as at $b'$, over the aperture. The body of the can A is of peculiar shape, and may be described as having a form in the likeness of a flattened truncated cone. In other words, it is flattened on two sides, (thus allowing economy of space in packing the cans for transportation,) and has its portions $c$ and $c'$ rounded, in order that its interior surface may afford no obstruction to the removal of its contents. The top portion $c$, being rounded or concave, also allows the small end of a piece of meat to be snugly doubled over, as shown in dotted lines in Figure 2, and thus economize space in packing the meat within the can; and as there are no corners in which the meat can seat itself or become wedged, the meat is readily withdrawn on removal of the bottom $d$. The body of the can, between the top portion $c$ and bottom $d$, I make of a single piece of sheet-tin united by a single lap-joint or seam, as at $e$, thus saving labor and expense in soldering, as compared with cans having a body constructed of more than one piece.

Fig. 1 shows the can ready to have the cooked meat packed therein, and the bottom $d$ soldered thereon. After the bottom is soldered on, the air and superfluous moisture are then pumped out through the aperture $b$, and after this is done the cover $b'$ is soldered over the aperture, thus completely sealing the can.

It will be seen that by my process of packing meats, whether cooked after taking them from the brine, or packed immediately after taken from the brine without being cooked, the meat is preserved in the shape in which it has been originally cut while raw, with reference to its use upon the table. Thus a roasting-piece of meat, after being cooked, will be put in the can in the form which is given to such pieces for table use; and so with other kinds of meat. In this way of packing and preserving meats each can will contain a specific meat, as, for instance, either a roasting-piece, or a steak, or a hind quarter of lamb, and so on, as the case may be; and as each can will be provided with an outside label designating its contents, the purchaser is in a great measure protected from deception as to the kind and quality of the meat he pays for. In other words, I do not can meat in a comminuted state, in which state or condition deception may be practiced as to its quality or kind. It will also be understood that the meat thus prepared and canned is not of the nature of what is known as corned-beef, or corned meat, but is of the nature and qualities of fresh meats.

I do not, in this application, claim the form or construction of the can above described, as such can constitutes the subject-matter of another application made by me for a patent.

Having described my invention, what I claim as new, and desire to secure by Letters Patent, is—

The method herein described for putting up and preserving fresh cooked meat, consisting in cutting it in the form of a roast, &c., in which it is to be served on the table, treating with a pickle made of salt, spices, and herbs, substantially such as described, then cooking and inclosing it in a properly-fitting hermetically-sealed case, all substantially as specified.

Witness my hand in the matter of my application for a patent for an improved process or mode of packing and preserving cooked and uncooked meats this 9th day of December, 1876.

MOSES BRENNER.

Witnesses:
WM. D. ELDRIDGE,
O. GEO. DEAVER.